US011066108B2

(12) United States Patent
Yoshida et al.

(10) Patent No.: US 11,066,108 B2
(45) Date of Patent: Jul. 20, 2021

(54) DAMPER HOUSING FOR VEHICLE

(71) Applicant: HONDA MOTOR CO., LTD., Tokyo (JP)

(72) Inventors: Masayasu Yoshida, Wako (JP); Yuya Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/816,327

(22) Filed: Mar. 12, 2020

(65) Prior Publication Data

US 2020/0317274 A1    Oct. 8, 2020

(30) Foreign Application Priority Data

Apr. 5, 2019   (JP) .............................. JP2019-073101

(51) Int. Cl.
*B62D 25/08*     (2006.01)
*B60G 13/00*     (2006.01)

(52) U.S. Cl.
CPC ......... *B62D 25/088* (2013.01); *B60G 13/003* (2013.01); *B60G 2204/128* (2013.01); *B60G 2206/41* (2013.01)

(58) Field of Classification Search
CPC ...... B62D 25/08; B62D 25/088; B62D 21/11; B62D 21/152; B60G 13/00; B60G 13/003; B62G 2204/128; B62G 2206/41
See application file for complete search history.

(56) References Cited

U.S. PATENT DOCUMENTS 9,193,241 B2 *  11/2015 Suchta ................. B60G 15/067
9,481,398 B2 *  11/2016 Ohoka .................... B23K 11/00
(Continued)

FOREIGN PATENT DOCUMENTS

DE    102014104838    10/2015
JP        59-13964      9/1984
(Continued)

OTHER PUBLICATIONS

Japanese Notice of Allowance for Japanese Patent Application No. 2019-073101 dated Jan. 12, 2021.

*Primary Examiner* — Paul N Dickson
*Assistant Examiner* — Caitlin Anne Miller
(74) *Attorney, Agent, or Firm* — Amin, Turocy & Watson, LLP

(57) ABSTRACT

A damper housing includes an upper-wall-plate and an upper-wall-reinforcement-plate. A plurality of collars through which fastening members for attaching a damper are interposed between the upper-wall-plate and the upper-wall-reinforcement-plate. The collars are disposed on a circumference around the damper. An upper section of the damper is fastened and fixed to the upper-wall-reinforcement-plate and the upper-wall-plate by the fastening members. A concave section is formed in at least one of the upper-wall-plate and the upper-wall-reinforcement-plate which are facing each other, the concave section being formed so as to protrude toward the facing upper-wall-plate or the upper-wall-reinforcement-plate. The concave section is disposed between the neighboring collars on the circumference on which the collars are disposed. The upper-wall-plate and the upper-wall-reinforcement-plate are coupled to the facing upper-wall-plate or the upper-wall-reinforcement-plate at the concave section.

9 Claims, 7 Drawing Sheets

(56) References Cited

U.S. PATENT DOCUMENTS

| | | | | |
|---|---|---|---|---|
| 2006/0006699 | A1* | 1/2006 | Matsuyama | B62D 25/088 |
| | | | | 296/203.02 |
| 2018/0170434 | A1* | 6/2018 | Saito | B62D 25/088 |
| 2018/0354559 | A1* | 12/2018 | Nakauchi | B62D 25/082 |
| 2019/0039652 | A1* | 2/2019 | Kamei | B62D 21/11 |

FOREIGN PATENT DOCUMENTS

| | | |
|---|---|---|
| JP | 62-200077 | 12/1987 |
| JP | 02-011775 | 1/1990 |
| JP | 03-258664 | 11/1991 |

* cited by examiner

DAMPER HOUSING FOR VEHICLE

CROSS-REFERENCE TO RELATED APPLICATION

Priority is claimed on Japanese Patent Application No. 2019-073101, filed Apr. 5, 2019, the content of which is incorporated herein by reference.

BACKGROUND OF THE INVENTION

Field of the Invention

The present invention relates to a damper housing for a vehicle configured to support an upper section of a damper of a suspension.

Description of Related Art

As a structure of a support section of a suspension of a vehicle, a structure in which an upper end portion of a damper is supported by a damper housing is known. The damper housing is, for example, a structure coupled to a front side frame and an upper member of the vehicle body and configured to support a load input from the damper to the vehicle body. The damper housing has an upper wall section, and an upper end portion of the damper is fastened and fixed to the upper wall section (for example, German Patent Publication No. 102014104838).

The damper housing disclosed in German Patent Publication No. 102014104838 includes a lower housing configured to cover an upper section and a circumferential region of the damper, and an upper housing that overlaps an upper wall of the lower housing. The upper housing has a cover wall that is joined to the upper wall of the lower housing so that the cover wall overlaps with the upper wall of the lower housing. The upper end portion of the damper is fastened to the upper wall of the lower housing and the cover wall of the upper housing using bolts.

SUMMARY OF THE INVENTION

The damper housing disclosed in German Patent Publication No. 102014104838 has a structure in which the cover wall of the upper housing overlaps and is joined to the upper wall of the lower housing, and the upper end portion of the damper is fastened to both of them by bolts in this state. For this reason, it is difficult to efficiently distribute and support a large load input from the upper section of the damper to the upper wall of the lower housing and the cover wall of the upper housing, and in order to stably support the input load, it is necessary to increase a thickness of the lower housing or the upper housing. However, when the thickness of the lower housing or the upper housing is increased, since this tends to cause an increase in vehicle weight and a rise in product costs, it is desired to devise a structure that can more efficiently support a load input from the upper section of the damper.

An aspect of the present invention is directed to providing a damper housing for a vehicle capable of efficiently increasing a support strength of an upper section of a damper.

A damper housing for a vehicle according to the present invention employs the following configurations.

(1) A damper housing for a vehicle according to the present invention is a damper housing for a vehicle configured to support a load input from a damper of a suspension, the damper housing for a vehicle including: an upper wall plate configured to cover the damper from at least above; and an upper wall reinforcement plate coupled to the upper wall plate at below the upper wall plate, wherein a plurality of collars through which fastening members for attaching the damper are inserted are interposed between the upper wall plate and the upper wall reinforcement plate, the plurality of collars being disposed on a circumference about a central axis of the damper, an upper section of the damper is fastened and fixed to the upper wall reinforcement plate and the upper wall plate by the fastening members inserted through the collars, a first concave section is provided in at least one of the upper wall plate and the upper wall reinforcement plate which are facing each other, the first concave section being formed on the upper wall plate or the upper wall reinforcement plate so as to protrude toward the facing upper wall plate or the upper wall reinforcement plate and being disposed between neighboring collars among the circumference on which the collars are disposed, and the upper wall plate or the upper wall reinforcement plate are coupled to the facing upper wall plate or the upper wall reinforcement plate at the first concave section.

According to the configuration of the above-mentioned (1), the load input from the upper section of the damper is distributed and supported by the upper wall reinforcement plate and the upper wall plate via the plurality of collars. Here, the load input from the upper section of the damper is distributed over a large area on the circumference of the upper wall plate and the upper wall reinforcement plate on which the collars are disposed through the coupling section in the first concave section. For this reason, when this configuration is employed, the input load can be uniformly distributed and transmitted to a wide range on the surfaces of the upper wall plate and the upper wall reinforcement plate due to the collars disposed on the circumference about a central axis of of the damper and the coupling sections in the first concave section disposed on the same circumference that on which the collars are arranged.

Accordingly, even when the upper wall plate or the upper wall reinforcement plate is formed of a thin plate member for reduction in weight, a sufficiently high damper support strength can be obtained.

(2) In the aspect of the above-mentioned (1), the damper housing for a vehicle may further include a lateral member configured to connect the upper wall plate and the upper wall reinforcement plate to an upper member of a side portion of the vehicle at an outer side position of the upper wall plate in a vehicle width direction, wherein the upper wall plate and the upper wall reinforcement plate are formed in a substantially rectangular shape when seen in a plan view, a second concave section is provided in at least one of the upper wall plate and the upper wall reinforcement plate which are facing each other, the second concave section being formed on the upper wall plate or the upper wall reinforcement plate so as to protrude toward the facing upper wall plate or the upper wall reinforcement plate and being disposed in a vicinity of a corner section of the upper wall plate or the upper wall reinforcement plate which is located at outer side in the vehicle width direction, and the lateral member may be coupled to at least one of the upper wall plate and the upper wall reinforcement plate at a position adjacent to the second concave section.

According to the aspect of the above-mentioned (2), when the coupling section in the second concave section is not present, a region with low rigidity is formed between the circumference on which the collars or the first concave sections are disposed and the corner sections of the upper wall plate and the upper wall reinforcement plate, and the load input from the upper section of the damper cannot be easily transmitted to the corner sections of the upper wall plate and the upper wall reinforcement plate. However, in this configuration, since the coupling section in the second concave section is disposed in the vicinity of the corner section of the upper wall plate and the upper wall reinforcement plate which are located at outer side in the vehicle width direction, the rigidity in the vicinity of the corner sections of the upper wall plate and the upper wall reinforcement plate which are located at outer side in the vehicle width direction is increased, and the load input from the upper section of the damper is easily uniformly transmitted also to the vicinity of the corner section. Further, since the lateral member is coupled to at least one of the upper wall plate and the upper wall reinforcement plate at a position adjacent to the second concave section, the load input from the upper section of the damper is efficiently transmitted to the upper member through the lateral member.

(3) In the aspect of the above-mentioned (1) or (2), the damper housing may further include: a front wall plate configured to cover at least a front of the damper; and a rear wall plate configured to cover at least a rear of the damper, wherein the upper wall plate has a substantially flat upper wall main body section configured to support an upper end portion of the damper and an upper wall bent section extending to be bent downward from an end portion of the upper wall main body section, the front wall plate has a front wall main body section configured to cover the front of the damper and a front wall bent section extending to be bent rearward from an inner end portion of the front wall main body section in the vehicle width direction, the rear wall plate has a rear wall main body section configured to cover the rear of the damper and a rear wall bent section extending to be bent forward from an inner end portion of the rear wall main body section in the vehicle width direction, and the front wall plate and the rear wall plate are coupled to each other at the front wall bent section and the rear wall bent section, the upper wall plate being coupled to the front wall plate and the rear wall plate at the upper wall bent section.

According to the configuration of the above-mentioned (3), the three plate members of the upper wall plate, the front wall plate and the rear wall plate form a basic configuration having the flat main body section and the bent section extending to be bent from the edge of the main body section. The damper housing has a configuration in which the three plate members are coupled to each other. For this reason, the damper housing can be formed by combining small simple components that can be easily molded.

(4) In the aspect of the above-mentioned (3), the upper wall main body section may have a lateral side extending substantially in a vehicle forward/rearward direction at inner side in the vehicle width direction, a front side extending substantially in the vehicle width direction at forward side in the vehicle forward/rearward direction, and a rear side extending substantially in the vehicle width direction at rearward side in the vehicle forward/rearward direction, the upper wall bent section may have a side bent piece extending to be bent downward from the lateral side, a front bent piece extending to be bent downward from the front side, and a rear bent piece extending to be bent downward from the rear side, and adjacent pieces of the side bent piece, the front bent piece and the rear bent piece may be formed as an integrated structure, and suspension support members may be attached to sections in the vicinity of a three-face joining section in which the upper wall main body section, the side bent piece and the front bent piece are substantially perpendicular to each other and a three-face joining section in which the upper wall main body section, the side bent piece and the rear bent piece are substantially perpendicular to each other.

In the case of the aspect of the above-mentioned (4), the suspension support member is attached to the upper wall plate at the vicinity section of the front and rear three-face joining sections having high rigidity. For this reason, the suspension is supported by the damper housing via the suspension support member with high rigidity.

(5) In the aspect of the above-mentioned (3) or (4), the upper wall reinforcement plate may have an upper wall reinforcement main body section disposed so as to face a lower side of the upper wall main body section, and an upper wall reinforcement bent section extending to be bent downward from an edge of the upper wall reinforcement main body section, and the upper wall reinforcement bent section may be coupled to the upper wall bent section.

In the case of the aspect of the above-mentioned (5), the upper wall reinforcement plate and the upper wall plate are integrally coupled to each other at the bent section of the edge, and configure a stronger support structure.

(6) In the aspect of the above-mentioned (5), the damper housing may further include an upper connecting plate that is disposed at least at one of between the upper wall main body section and an upper position of the front wall main body section and between the upper wall main body section and an upper position of the rear wall main body section and that is configured to connect the upper wall plate to the upper member of the side portion of the vehicle, wherein the upper connecting plate has a coupling flange joined to the upper wall bent section at a position in front of or rear of the upper wall plate, a suspension support member extending outward from the front wall bent section or the rear wall bent section in the vehicle width direction is interposed between the upper wall bent section and the coupling flange, the coupling flange has a cutout section, and the suspension support member is joined to at least one member of the upper wall bent section and the upper wall reinforcement bent section in the cutout section of the coupling flange, and joined to at least the coupling flange among the coupling flange and the upper wall bent section in an area in which the cutout section is not present.

According to the configuration of the above-mentioned (6), the suspension support member is strongly joined to at least one of the upper wall bent section and the upper wall reinforcement bent section, and the coupling flange of the upper connecting plate, while being sandwiched between the upper wall bent section and the coupling flange. The suspension support member is preferably laid as a third layer and joined to the upper wall reinforcement bent section and the upper wall bent section in the cutout section, and laid as a third layer and joined to the upper wall bent section and the coupling flange in the area in which the cutout section is not present. In this case, since the members are laid as a third layer and joined to each other, they can be easily joined through resistance welding means such as spot welding or the like.

(7) In the aspect of the above-mentioned (6), the upper connecting plate may have a crank-shaped cross-sectional shape extending substantially in the vehicle width direction.

In the case of the aspect of the above-mentioned (7), the load input from the damper or another suspension member to the upper wall plate, the front wall plate, the rear wall plate, or the like, is efficiently supported by the upper member through the upper connecting plate having the crank-shaped cross section and having high rigidity. For this reason, it is possible to reduce the thickness of the lateral member connected to the outer side of the upper wall plate in the vehicle width direction, reduce the weight of the lateral member by adding a weight-reducing hole, or the like.

(8) In the aspect of any one of the above-mentioned (3) to (7), the rear wall plate and the front wall plate may be disposed on an upper part of a front side frame of the vehicle, the front side frame may have a bending starting section that becomes a starting point of deformation when a shock load is input from the vehicle forward/rearward direction, the front wall bent section and the rear wall bent section may be joined to each other in an overlapping manner, and an end portion in the vehicle forward/rearward direction of the overlapping part between the front wall bent section and the rear wall bent section may be disposed at substantially same position as the bending starting section in the vehicle forward/rearward direction.

In the case of the aspect of the above-mentioned (8), when a shock load is input from the vehicle forward/rearward direction and the front side frame starts to deform from a bending starting section as a center, an end portion of the overlapping part between the front wall bent section and the rear wall bent section disposed almost directly above the bending starting section becomes a deformation starting point of the damper housing. For this reason, a collapse region can be enlarged by deforming the damper housing together with the front side frame during input of the shock load from the vehicle forward/rearward direction, and the input shock can be flexibly absorbed. Accordingly, when the configuration is employed, both of rigid support properties with respect to the suspension in normal use and a flexible shock absorption property during shock input from the vehicle forward/rearward direction can be guaranteed.

(9) In the aspect of the above-mentioned (4), the damper housing may include a connecting point of a tower bar configured to minimize twisting of left and right damper support sections of the vehicle, wherein the connecting point may be disposed in a vicinity of the three-face joining section of the upper wall main body section.

In the case of the aspect of the above-mentioned (9), since the tower bar is connected to the vicinity of the three-face joining section having high rigidity, twist of the left and right damper support sections of the vehicle can be efficiently minimized. In addition, since the connecting point of the tower bar is disposed at a position deviated from a fastening place of the damper upper section disposed on the circumference about the central axis of the damper, disposition of the tower bar is not restricted by a fastening area of the damper upper section.

According to the aspect of the present invention, the load input from the upper section of the damper can be distributed to and supported by the upper wall reinforcement plate and the upper wall plate via the plurality of collars, and the load can be uniformly distributed and transmitted to a wide range on the surfaces of the upper wall reinforcement plate and the upper wall plate by the coupling section in the first concave section. Accordingly, when the present invention is employed, a support strength of the upper section of the damper can be efficiently increased.

DETAILED DESCRIPTION OF THE INVENTION

Figure 1:
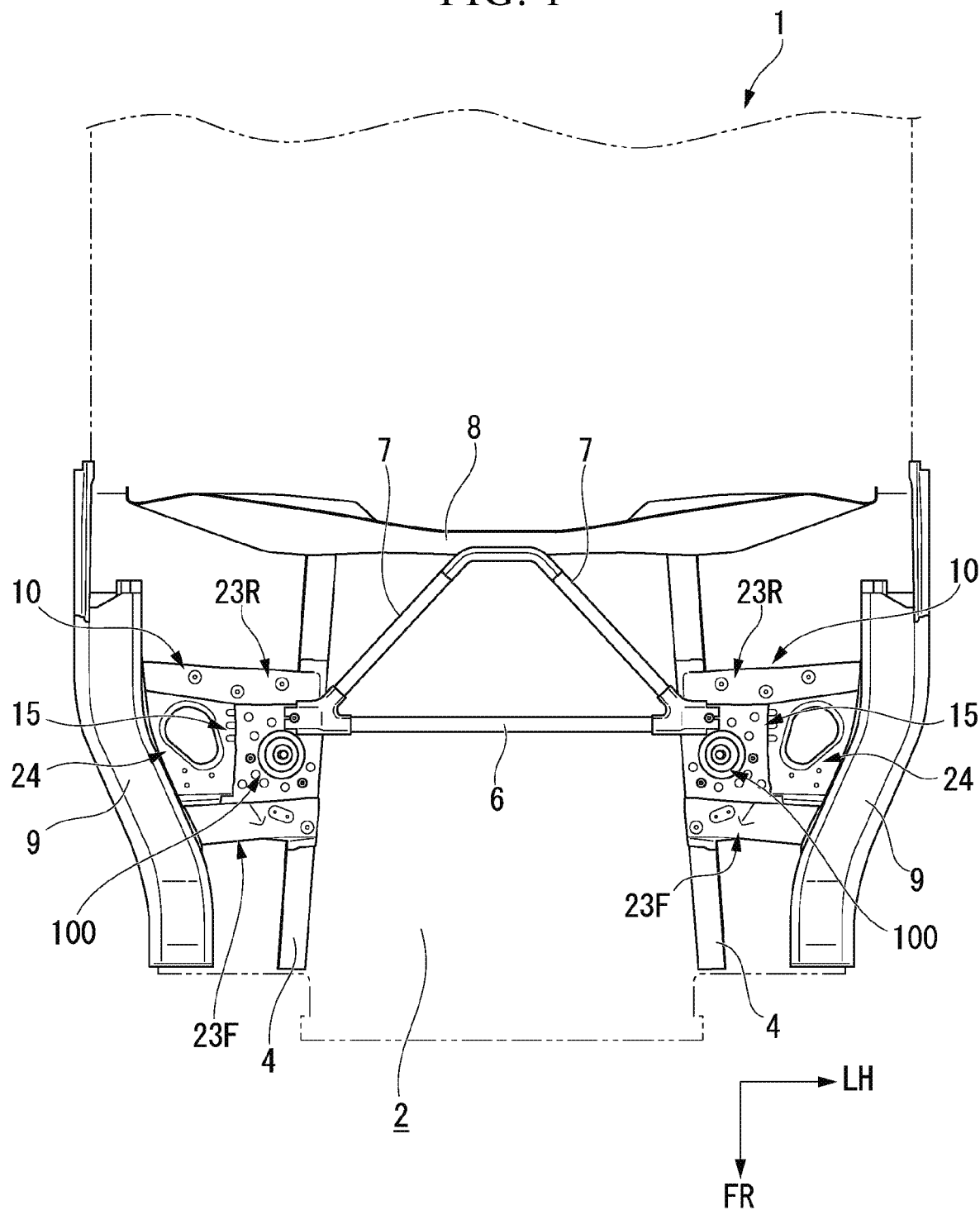
FIG. 1 is a plan view of a skeleton section of a vehicle of an embodiment.

Hereinafter, embodiments of the present invention will be described with reference to the accompanying drawings. Further, in appropriate places in the drawings, an arrow FR indicates a forward direction with respect to a vehicle 1, an arrow UP indicates an upward direction with respect to the vehicle 1, and an arrow LH indicates a leftward direction with respect to the vehicle 1.

Figure 2:
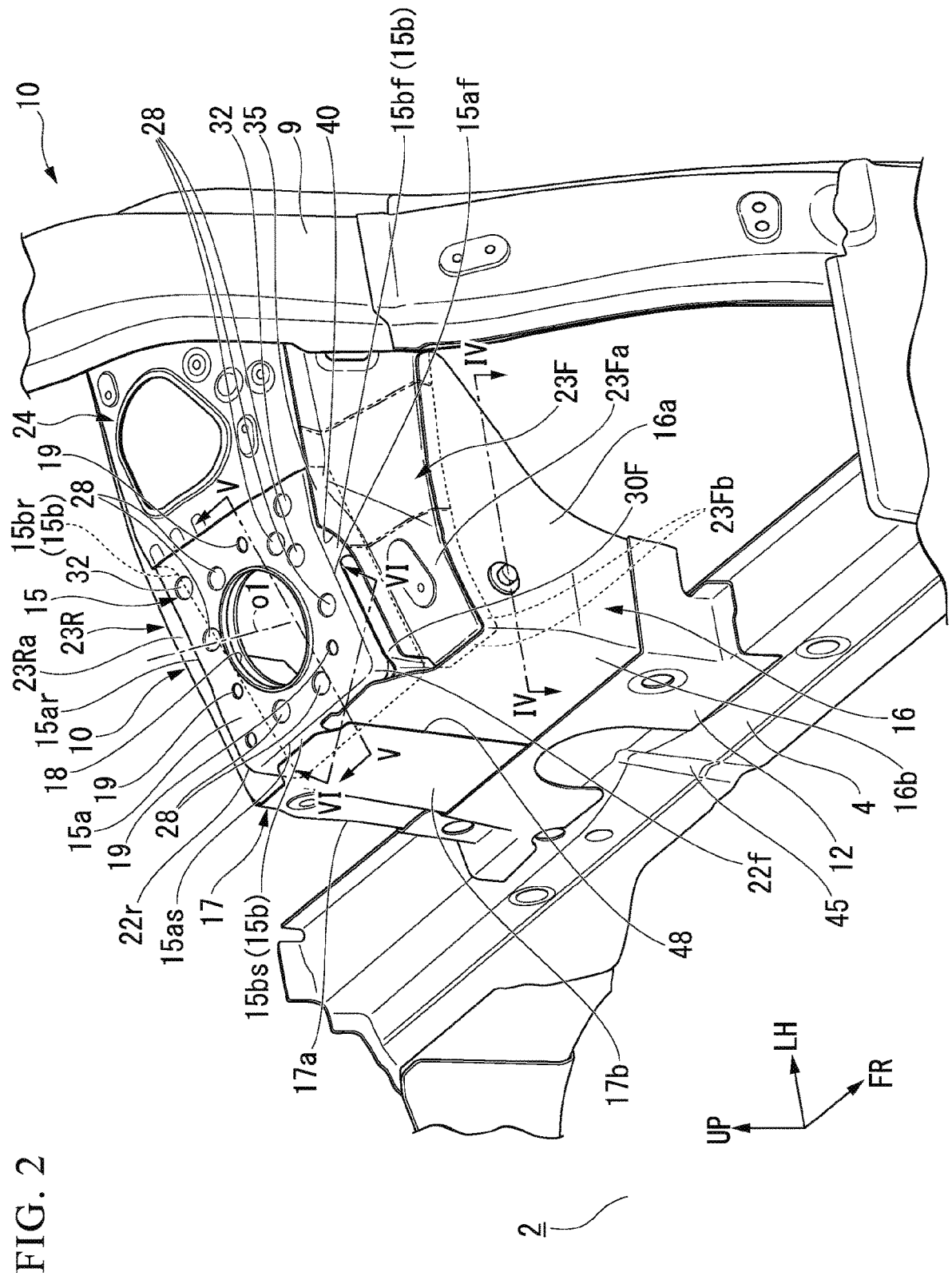
FIG. 2 is a perspective view of an attachment section of a damper housing of the embodiment.

FIG. 1 is a view showing a skeleton section on a side of a front section of the vehicle 1 of the embodiment from above, and FIG. 2 is a view showing an attachment section of damper housings 10 of the embodiment from above a right front section of the vehicle 1. Further, FIG. 2 shows the damper housing 10 disposed on a left side of the vehicle.

Reference numeral 2 in the drawings is an engine compartment disposed in front of a passenger compartment. A pair of front side frames 4 extending substantially in a vehicle forward/rearward direction are disposed on both sides of a lower side of the engine compartment 2 in a vehicle width direction. Rear end portions of the left and right front side frames 4 are connected to left and right side seals (not shown) via a cross member (not shown) or the like.

In addition, upper members 9 extending to be curved from left and right front pillars (not shown) toward below a front section of the vehicle body are disposed on both sides of an upper side of the engine compartment 2 in the vehicle width direction.

Front end portions of the upper members 9 extend to be curved to the vicinity of front end portions of the front side frames 4. The left and right upper members 9 are disposed to be offset outward in the vehicle width direction with respect to the left and right front side frames 4. Front end portions of the upper members 9 are coupled to front end portions of the corresponding left and right front side frames 4 via a connecting member (not shown).

The damper housings 10 configured to support upper sections of dampers 11 (see FIG. 3 and FIG. 4) of front suspensions 100 are disposed in inner regions close to rear sections of the left and right upper members 9 in the vehicle width direction. In the damper housings 10, lower end sides are coupled to the corresponding left and right front side frames 4 via a base member 12, and outer edge portions on the side of the upper section in the vehicle width direction are coupled to the corresponding left and right upper members 9. In addition, upper surfaces of the left and right damper housings 10 of the vehicle are connected to each other by a tower bar 6 extending in the vehicle width direction.

The tower bar 6 minimizes twist of left and right suspension support sections. In addition, upper surfaces of the left and right damper housings 10 of the vehicle are also connected to a partition wall 8 in front of the passenger compartment via an auxiliary connecting bar 7.

Figure 3:
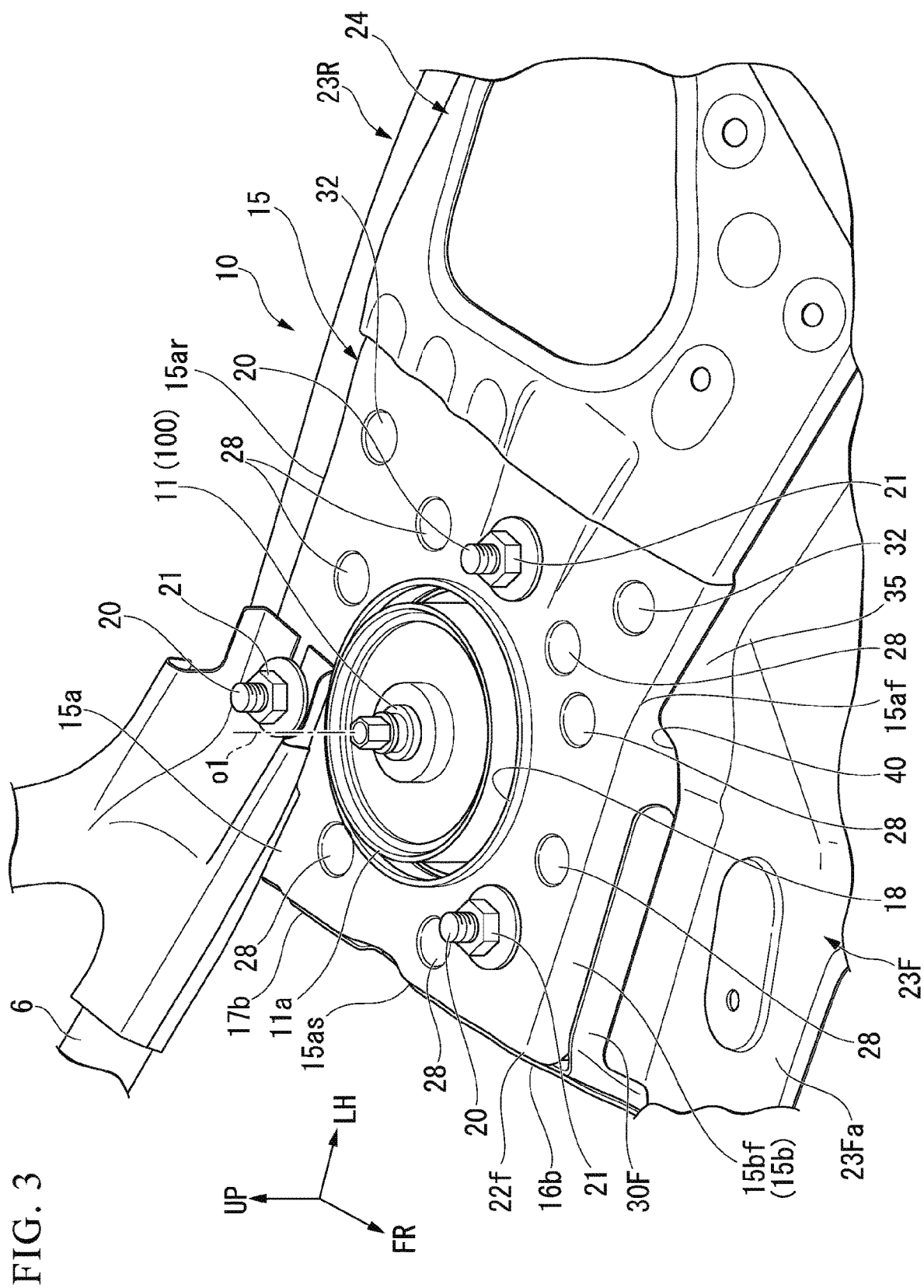
FIG. 3 is a perspective view of the damper housing of the embodiment.
Figure 4:
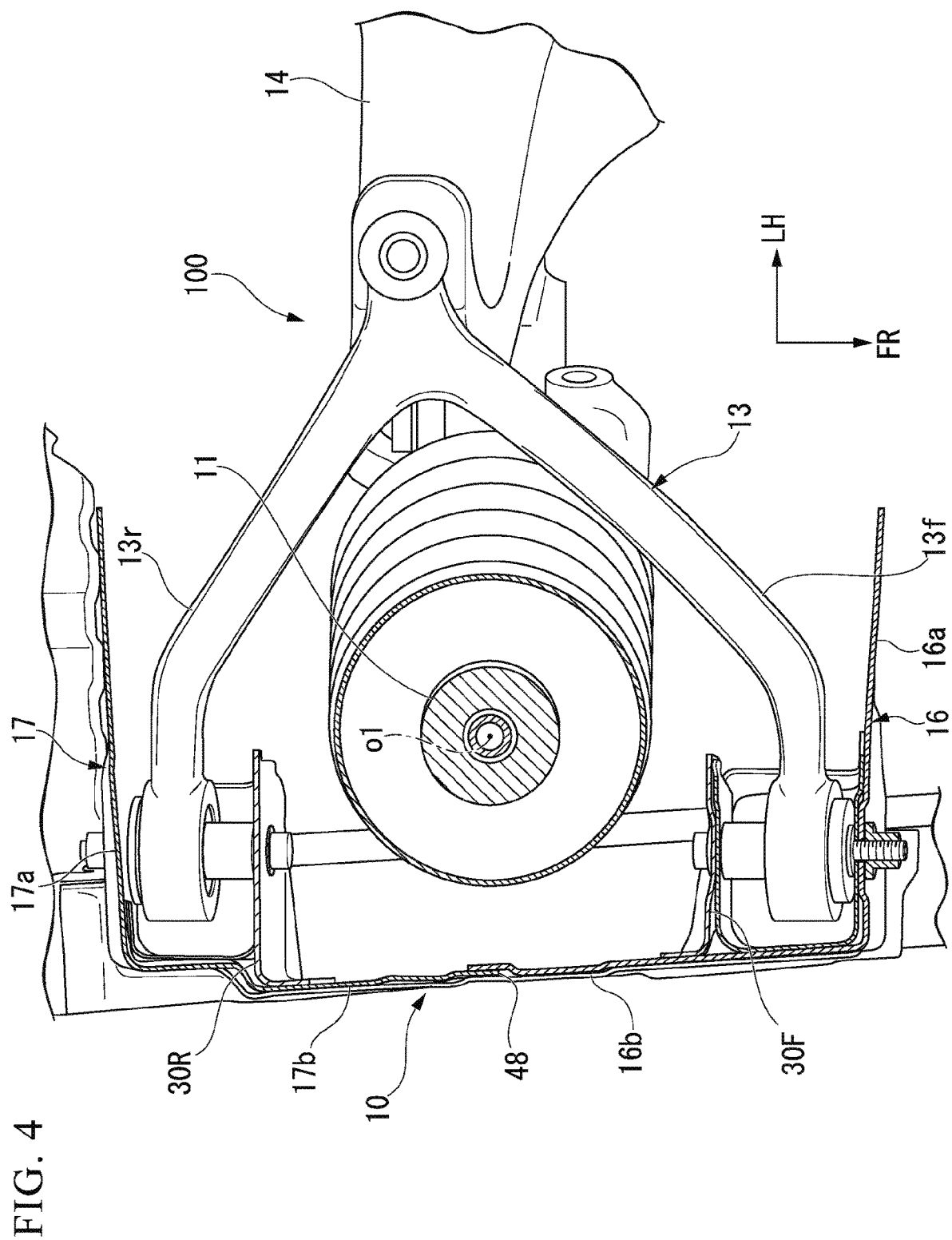
FIG. 4 is a partial cross-sectional plan view showing a cross section of the damper housing of the embodiment taken along line IV-IV in FIG. 2.

FIG. 3 is a view showing the damper housing 10 on the left side of the vehicle when seen from above at a left front side thereof, and FIG. 4 is a cross-sectional view taken along line IV-IV in FIG. 2.

As shown in FIG. 4, the front suspension 100 includes a plurality of suspension arms 13 configured to vertically swingably support a front wheel (not shown), a suspension spring (not shown) configured to absorb a shock input from the front wheel, and the damper 11 configured to attenuate the shock input from the front wheel. In FIG. 4, the suspension arm 13 disposed on the side of the upper section and configured to support an upper section of a front wheel knuckle 14 is shown. The base end side of the suspension arm 13 bifurcates in a vehicle forward/rearward direction, and end portions of two arm sections 13f and 13r that bifurcate are rotatably axially supported at inside of the damper housings 10. The damper 11 is disposed to stand up between the two arm sections 13f and 13r, and an upper end portion thereof is connected to an upper wall of the damper housing 10.

The damper housing 10 is configured by joining a plurality of plate members formed of a metal.

Specifically, the damper housing 10 includes an upper wall plate 15 configured to mainly cover an upward side of the damper 11, a front wall plate 16 configured to mainly cover the damper 11 on a front side of the vehicle, and a rear wall plate 17 configured to mainly cover the damper 11 on a rear side of the vehicle.

The upper wall plate 15 is formed in a substantially rectangular shape when seen in a plan view, and has a substantially flat upper wall main body section 15a configured to support an upper end portion of the damper 11 at a central region, and an upper wall bent section 15b extending to be curved downward from an edge of the upper wall main body section 15a. The upper wall main body section 15a has a substantially circular opening section 18 into which a boss section 11a of the upper section of the damper 11 is inserted into a central region thereof, and a damper base 11b (see FIG. 6) of the upper end of the damper 11 is fastened and fixed to a circumferential edge portion of the opening section 18. Reference numeral 19 in FIG. 2 designates a bolt insertion hole into which a bolt 20 protruding from the damper base 11b is inserted, and reference numeral 21 in FIG. 3 designates a nut screwed to a shaft section of the bolt 20 inserted into the bolt insertion hole 19. A plurality of (in the embodiment, three) bolt insertion holes 19 are disposed at equal intervals on a circumference about the central axis o1 of the damper 11 (a central position of the opening section 18).

Further, both of end portions of the tower bar 6 and the auxiliary connecting bar 7 are fixed to the bolts 20 protruding upward from the upper wall main body section 15a and disposed on the side of the rear section of the vehicle by nuts 21.

In addition, in the embodiment, the bolt 20 configures a fastening member for attachment of the damper.

The upper wall main body section 15a has a lateral side 15as extending substantially in the vehicle forward/rearward direction inward in the vehicle width direction, a front side 15af extending substantially in the vehicle width direction on a forward side in the vehicle forward/rearward direction, and a rear side 15ar extending substantially in the vehicle width direction on a rearward side in the vehicle forward/rearward direction. The upper wall bent section 15b has a side bent piece 15bs extending to be bent downward from the lateral side 15as, a front bent piece 15bf extending to be bent downward from the front side 15af, and a rear bent piece 15br extending to be bent downward from the rear side 15ar. The side bent piece 15bs, the front bent piece 15bf and the rear bent piece 15br are formed as an integrated structure with no gaps. Accordingly, the three of the upper wall main body section 15a, the side bent piece 15bs and the front bent piece 15bf that are substantially perpendicular to each other configure a three-face joining section 22f on the front side, and the three of the upper wall main body section 15a, the side bent piece 15bs, the rear bent piece 15br that are perpendicular to each other configure a three-face joining section 22r on the rear side. The front wall plate 16 has a flat front wall main body section 16a configured to cover a side in front of the upper section of the damper 11, and a front wall bent section 16b that extends by being bent at approximately right angle toward a rear side of the vehicle from an inner edge of the front wall main body section 16a in the vehicle width direction. The front wall main body section 16a is disposed so as to be spaced a predetermined distance toward the front side of the vehicle with respect to the front side 15af of the upper wall main body section 15a (a front surface of the front bent piece 15bf). The front wall bent section 16b extends toward the rear of the vehicle at a position in the vehicle width direction substantially overlapping the lateral side 15as of the upper wall main body section 15a and covers substantially a front half region of the upper section of the damper 11 which is disposed on an inward side in the vehicle width direction.

The rear wall plate 17 has a flat rear wall main body section 17a configured to cover a side behind of the upper section of the damper 11, and a rear wall bent section 17b that extends by being bent at approximately right angle toward a front side of the vehicle from an inner edge of the rear wall main body section 17a in the vehicle width direction. The rear wall main body section 17a is disposed so as to be spaced a predetermined distance toward the rear side of the vehicle with respect to from the rear side 15ar of the upper wall main body section 15a (a rear surface of the rear bent piece 15br). The rear wall bent section 17b extends toward the front of the vehicle at a position in the vehicle width direction substantially overlapping the lateral side 15as of the upper wall main body section 15a and covers a substantially a rear half region of the upper section of the damper 11 which is disposed on the inward side in the vehicle width direction. The rear wall bent section 17b partially overlaps the front wall bent section 16b of the front wall plate 16 in the vehicle forward/rearward direction and is integrally coupled thereto through spot welding or the like in a state overlapping an inner surface of the front wall bent section 16b which is disposed inside in the vehicle width direction. Accordingly, the front wall plate 16 and the rear wall plate 17 form a substantially reversed C-shaped horizontal cross-sectional shape that opens outward in the vehicle width direction.

In addition, the surface of the side bent piece 15bs of the upper wall plate 15 (the upper wall bent section 15b) directed inward in the vehicle width direction overlaps the outer surfaces of the front wall bent section 16b and the rear wall bent section 17b in the vehicle width direction, and is integrally coupled to the front wall bent section 16b and the rear wall bent section 17b through spot welding or the like in this state.

A front upper connecting plate 23F configured to connect a front edge portion of the upper wall plate 15 to the upper member 9 is disposed between the upper end portion of the front wall main body section 16a and the front side 15af of the upper wall plate 15. Similarly, a rear upper connecting plate 23R configured to connect a rear edge portion of the upper wall plate 15 to the upper member 9 is disposed between the upper end portion of the rear wall main body section 17a and the rear side 15ar of the upper wall plate 15. In addition, an end portion of an outer edge connecting plate 24 overlaps an upper surface of an outer edge portion of the upper wall plate 15 (the upper wall main body section 15a) in the vehicle width direction, and the outer edge connecting plate 24 is joined thereto through spot welding or the like in this state. The outer edge connecting plate 24 connects the upper wall plate 15 to the upper member 9 at an outward position of the upper wall plate 15 in the vehicle width direction. In the embodiment, the outer edge connecting plate 24 constitutes a lateral member. In addition, in the embodiment, front upper connecting plate 23F and the rear upper connecting plate 23R constitute an upper connecting plate. A detailed structure of the front upper connecting plate 23F and the rear upper connecting plate 23R will be described below.

Figure 5:
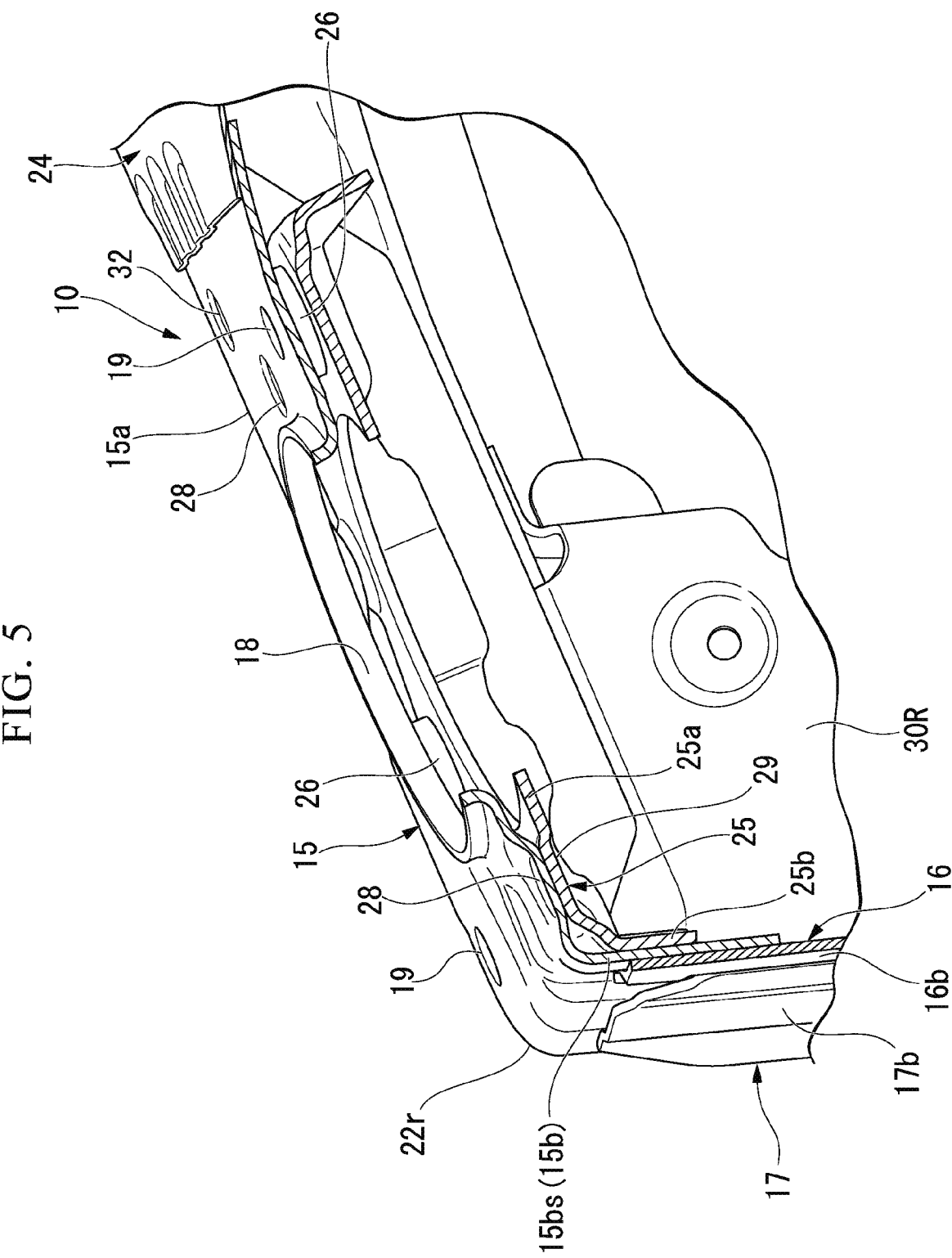
FIG. 5 is a partial cross-sectional perspective view showing a cross section of the damper housing of the embodiment taken along line V-V in FIG. 2.
Figure 6:
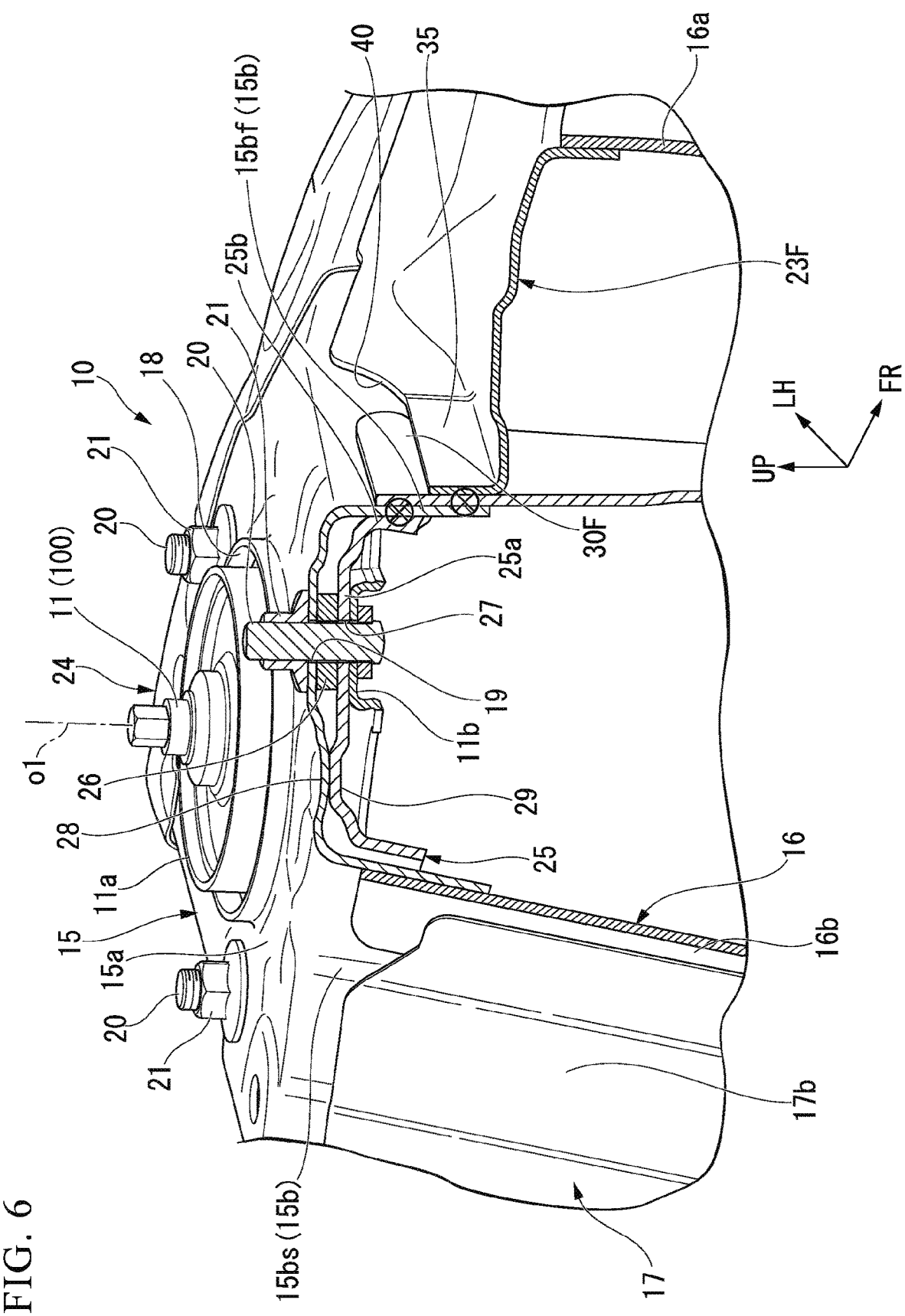
FIG. 6 is a partial cross-sectional perspective view showing a cross section of the damper housing of the embodiment taken along line VI-VI in FIG. 2.

FIG. 5 is a partial cross-sectional perspective view showing a cross section of the damper housing 10 taken along line V-V in FIG. 2, and FIG. 6 is a partial cross-sectional perspective view showing a cross section of the damper housing 10 taken along line VI-VI in FIG. 2.

As shown in FIG. 5 and FIG. 6, the damper housing 10 includes an upper wall reinforcement plate 25 coupled to the upper wall plate 15 at below the upper wall plate 15. The upper wall reinforcement plate 25 has an upper wall reinforcement main body section 25a disposed so as to face a lower side of the upper wall main body section 15a, and an upper wall reinforcement bent section 25b extending by being bent downward from the edge of the upper wall reinforcement main body section 25a at approximately right angle. The upper wall reinforcement main body section 25a is formed in a substantially rectangular shape that is slightly smaller than the upper wall main body section 15a when seen in a plan view. Like the upper wall bent section 15b, the upper wall reinforcement bent section 25b is disposed on an inner edge in the vehicle width direction, a vehicle front-side edge and a vehicle rear-side edge of the upper wall reinforcement main body section 25a, and all of which are integrally connected to each other. The upper wall reinforcement bent section 25b overlaps an inner side of the upper wall bent section 15b and is integrally coupled thereto through spot welding or the like.

In addition, three collars 26 are disposed between the upper surface of the upper wall reinforcement main body section 25a and the upper wall main body section 15a. The collars 26 are disposed below positions at which the bolt insertion holes 19 of the upper wall main body section 15a are formed. The plurality of collars 26 are disposed on a circumference about the central axis o1 of the damper 11. In addition, bolt insertion holes 27 are formed at installation positions of the collars 26 of the upper wall reinforcement main body section 25a. Shaft sections of the bolts 20 protruding from the damper base 11b are inserted into the bolt insertion holes 27 of the upper wall reinforcement main body section 25a, the collars 26, and the bolt insertion holes 19 of the upper wall main body section 15a, and the nuts 21 are fastened to the shaft sections of the bolts 20 from above the upper wall main body section 15a. Thus, the damper 11 is fastened and fixed to the upper wall reinforcement plate 25 and the upper wall plate 15.

A plurality of circular concave sections 28 (first concave sections) recessed downward are formed in a circumferential region of the opening section 18 of the upper wall main body section 15a. The plurality of concave sections 28 are disposed between the neighboring bolt insertion holes 19 on a circumference of arrangement of the plurality of bolt insertion hole 19 of the upper wall main body section 15a (a circumference on which the plurality of collars 26 are arranged). A plurality of concave sections 29 recessed upward are formed at positions facing the concave sections 28 of the upper wall reinforcement main body section 25a on the side of the upper wall main body section 15a. The concave sections 28 on the side of the upper wall main body section 15a and the concave sections 29 on the side of the upper wall reinforcement main body section 25a vertically butt against each other, and the butted sections are joined through spot welding or the like.

Further, the joining at the concave sections 28 and 29 is not limited to the spot welding, and the joining may be performed by rivet joining or an adhesive agent. In addition, the concave section may be formed in either the upper wall main body section 15a or the upper wall reinforcement main body section 25a.

As shown in FIG. 2 and FIG. 3, circular concave sections 32 (second concave sections) recessed downward are formed in the vicinity of front and rear corner sections of the upper wall main body section 15a which are located outer side in the vehicle width direction. The concave sections 32 are disposed outside in the radial direction than the circumference formed by the arrangement of the bolt insertion holes 19 and the concave sections 28 on the upper wall main body section 15a. In addition, while not shown, the circular concave sections (second concave sections) recessed upward are formed in the vicinity of the front and rear corner sections of the upper wall reinforcement main body section 25a which are located outer side in the vehicle width direction. The concave sections 32 in the vicinity of the front and rear corner sections of the upper wall main body section 15a and the concave section in the vicinity of the front and rear corner sections of the upper wall reinforcement main body section 25a butt against each other in an upward/downward direction, and are joined to each other through spot welding or the like. Here, as described above, while the outer edge connecting plate 24 overlapping an outer edge of the upper wall main body section 15a in the vehicle width direction is joined to the upper wall main body section 15a through spot welding or the like, a part of the outer edge connecting plate 24 is disposed at a position of the edge of the upper wall main body section 15a adjacent to the front and rear concave sections 32. A part of the outer edge connecting plate 24 is joined to a portion of the upper wall main body section 15a adjacent to the front and rear concave sections 32.

Further, in the embodiment, while the concave sections 32 are provided in the vicinity of the front and rear corner sections of the upper wall main body section 15a and in the vicinity of the front and rear corner sections of the upper wall reinforcement main body section 25a, the concave section 32 in the vicinity of the corner section may be formed in only either the upper wall main body section 15a or the upper wall reinforcement main body section 25a.

In addition, as shown in FIG. 3, FIG. 4, or the like, support brackets 30F and 30R (suspension support members) configured to pivotably axially support the arm section 13f on the front side and the arm section 13r on the rear side of the suspension arm 13 are joined to an outer surface of the front wall bent section 16b of the front wall plate 16 in the vehicle width direction and an outer surface of the rear wall bent section 17b of the rear wall plate 17 in the vehicle width direction. The support brackets 30F and 30R extend outward in the vehicle width direction to be substantially parallel to the front wall main body section 16a or the rear wall main body section 17a. An end portion of the arm section 13f on the front side is disposed between the front wall main body section 16a and the support bracket 30F, and pivotably axially supported by the front wall main body section 16a and the support bracket 30F. An end portion of the arm section 13r on the rear side is disposed between the rear wall main body section 17a and the support bracket 30R, and pivotably axially supported by the rear wall main body section 17a and the support bracket 30R.

The three-face joining section 22f on the front side of the upper wall plate 15 is disposed above a root section of the support bracket 30F on the front side shown in FIG. 4 (a joining section to the front wall bent section 16b). The side bent piece 15bs of the three-face joining section 22f is joined to the root section of the support bracket 30F and the front wall bent section 16b. Accordingly, the support bracket 30F is attached to the vicinity section of the three-face joining section 22f on the front side.

Similarly, the three-face joining section 22r on the rear side of the upper wall plate 15 is disposed above the root section of the support bracket 30R on the rear side (a joining section to the rear wall bent section 17b). The side bent piece 15bs of the three-face joining section 22r is joined to the root section of the support bracket 30R and the rear wall bent section 17b. Accordingly, the support bracket 30R is attached to the vicinity section of the three-face joining section 22r on the rear side.

Here, the front upper connecting plate 23F has a connecting plate main body section 23Fa configured to cover a front side of the damper 11 from above at a height position one step lower than the upper surface of the upper wall main body section 15a of the upper wall plate 15, a coupling flange 35 extending by being bent upward from an edge portion of the connecting plate main body section 23Fa on the rear side of the vehicle, and a connecting plate bent section 23Fb (see FIG. 2) extending by being bent downward from an edge portion of the connecting plate main body section 23Fa on the inner side in the vehicle width direction and an edge portion on the front side of the vehicle. The coupling flange 35 overlaps a front surface of the front bent piece 15bf of the upper wall plate 15 and is joined to the front bent piece 15bf. In addition, the connecting plate bent section 23Fb is joined to the front wall main body section 16a and the front wall bent section 16b of the front wall plate 16. In the front upper connecting plate 23F, a cross section in the vehicle forward/rearward direction is formed in a crank shape by the coupling flange 35, the connecting plate main body section 23Fa and the connecting plate bent section 23Fb, and a cross-sectional shape thereof extends substantially in the vehicle width direction.

As shown in FIG. 3 and FIG. 6, a cutout section 40 is formed in the coupling flange 35 of the front upper connecting plate 23F. The cutout section 40 is formed in an inner region of the coupling flange 35 in the vehicle width direction, and a height of the upper end portion is decreased in a stepped manner. The support bracket 30F on the front side extending outward from the front wall bent section 16b of the front wall plate 16 in the vehicle width direction is interposed between the front bent piece 15bf of the upper wall plate 15 and the inner region of the coupling flange 35 in the vehicle width direction. A part of the upper region of the support bracket 30F is exposed to the outside through the cutout section 40. As shown in FIG. 6, the support bracket 30F is laid as a third layer on the upper wall bent section 15b of the upper wall plate 15 and the upper wall reinforcement bent section 25b of the upper wall reinforcement plate 25 at inside the cutout section 40 of the coupling flange 35 and joined thereto through spot welding or the like. In addition, the support bracket 30F is laid as a third layer on the coupling flange 35 and the upper wall bent section 15b of the upper wall plate 15 in the lower region of the coupling flange 35 below the cutout section 40, and joined thereto through spot welding or the like.

Further, while the support bracket 30F is laid as a third layer and joined to the upper wall bent section 15b (the upper wall plate 15) and the upper wall reinforcement bent section 25b (the upper wall reinforcement plate 25) at inside the cutout section 40 in the embodiment, the support bracket 30F may be joined to only the upper wall bent section 15b (the upper wall plate 15) at inside the cutout section 40. In addition, a notch or an opening may be appropriately formed in the upper wall bent section 15b, and the support bracket 30F may be joined to only the upper wall reinforcement bent section 25b (the upper wall reinforcement plate 25) through the notch or the opening. Further, while the support bracket 30F is laid as a third layer and joined to the coupling flange 35 and the upper wall bent section 15b (the upper wall plate 15) in an area in which the cutout section 40 is not provided in the embodiment, the support bracket 30F may be joined to only the coupling flange 35 in the area in which the cutout section 40 is not provided. The support bracket 30F is strongly fixed with at least one of the upper wall bent section 15b and the upper wall reinforcement bent section 25b and the coupling flange 35 is a state being sandwiched between the upper wall bent section 15b and the coupling flange 35 even when any one of these joining structures is employed.

While detailed illustration is omitted, the rear upper connecting plate 23R has the same surface as the front upper connecting plate 23F. However, a coupling flange of the rear upper connecting plate 23R is laid on the rear surface of the rear bent piece 15br of the upper wall plate 15 and is joined to the rear bent piece 15br. Like the front upper connecting plate 23F, a cutout section is formed in the coupling flange of the rear upper connecting plate 23R. Then, the support bracket 30R on the rear side is interposed between the rear bent piece 15br of the upper wall plate 15 and the coupling flange, and like the support bracket 30F on the front side, the support bracket 30R on the rear side is joined to the upper wall bent section 15b, the upper wall reinforcement bent section 25b and the coupling flange through spot welding or the like.

In addition, as shown in FIG. 2, a bending starting section 45 that becomes a starting point of deformation when a shock load is input from the vehicle forward/rearward direction is provided on the front side frame 4. In the damper housing 10 coupled to the front side frame 4 via the base member 12, an end portion 48 in the vehicle forward/rearward direction of an overlapping section between the front wall bent section 16b of the front wall plate 16 and the rear wall bent section 17b of the rear wall plate 17 is disposed almost directly above the bending starting section 45. That is, the end portion 48 of the overlapping section between the front wall bent section 16b and the rear wall bent section 17b is disposed at substantially the same position in the vehicle forward/rearward direction as the bending starting section 45 of the front side frame 4.

As described above, in the damper housings 10 of the embodiment, the plurality of collars 26 into which the bolts 20 for damper attachment are inserted are interposed between the upper wall plate 15 and the upper wall reinforcement plate 25, and the plurality of collars 26 are disposed on the circumference about the central axis o1 of the damper 11. Then, the upper section of the damper 11 is fastened and fixed to the upper wall reinforcement plate 25 and the upper wall plate 15 by the bolts 20 inserted into the collars 26. For this reason, the load input from the upper section of the damper 11 is distributed and supported by the upper wall reinforcement plate 25 and the upper wall plate 15 via the plurality of collars 26.

In addition, in the damper housing 10 of the embodiment, the concave sections 28 and 29 are formed in the upper wall plate 15 and the upper wall reinforcement plate 25, respectively, and each of the concave sections 28 and 29 are disposed between the neighboring collars 26 on the circumference on which the collars 26 are disposed, and the upper wall plate 15 and the upper wall reinforcement plate 25 are coupled to each other in the concave sections 28 and 29. For this reason, the load input from the upper section of the damper 11 is distributed over a large area on the circumference, on which the collars 26 are disposed, of the upper wall plate 15 and the upper wall reinforcement plate 25 through the coupling section in the concave sections 28 and 29.

Accordingly, in the damper housing 10 of the embodiment, the input load can be uniformly distributed and transmitted to a wide range on the surfaces of the upper wall plate 15 and the upper wall reinforcement plate 25 by the collars 26 disposed on the circumference about the central axis of of the damper 11 and the coupling section in the concave sections 28 and 29 disposed on the same circumference as the arrangement of the collars 26. Accordingly, when the damper housing 10 of the embodiment is employed, a support strength of the upper section of the damper 11 can be efficiently increased, and even when the upper wall plate 15 or the upper wall reinforcement plate 25 is formed of a thin plate member for reduction in weight, a sufficiently high damper support strength can be obtained.

In addition, in the damper housing 10 of the embodiment, the upper wall plate 15 and the upper wall reinforcement plate 25 are formed in a substantially rectangular shape when seen in a plan view, the concave sections 32 protruding in facing directions are formed in the vicinity of the corner sections of the upper wall plate 15 and the upper wall reinforcement plate 25 which are located at outer side in the vehicle width direction, and the outer edge connecting plate 24 is coupled to the upper wall plate 15 at a position adjacent to the concave sections 32. For this reason, rigidity in the vicinity of the corner section of the upper wall plate 15 and the upper wall reinforcement plate 25 which are located at outer side in the vehicle width direction is increased, and the load input from the upper section of the damper 11 can also be uniformly transmitted to the vicinity of the corner section. Accordingly, when the configuration is employed, the load input from the upper section of the damper 11 can be efficiently transmitted to the upper member 9 through the outer edge connecting plate 24 coupled to the upper wall plate 15.

In addition, the damper housing 10 of the embodiment has a basic configuration in which three plate members of the upper wall plate 15, the front wall plate 16 and the rear wall plate 17 each has a flat main body section and a bent section extending to be bent from an edge of the main body section, and the three plate members are configured to be coupled to each other. For this reason, when the damper housing 10 of the embodiment is employed, since the damper housing 10 can be formed by combination of small simple components that can be easily molded, production efficiency can be increased.

In addition, in the damper housing 10 of the embodiment, the three-face joining sections 22f and 22r are provided in front of and in rear of the upper wall plate 15, and the support brackets 30F and 30R configured to support the suspension arms 13 are attached to sections in the vicinity of the three-face joining sections 22f and 22r having high rigidity. For this reason, when the damper housing 10 of the configuration is employed, the suspension arm 13 can be supported by the damper housing 10 with high rigidity.

Further, in the damper housing 10 of the embodiment, the upper wall reinforcement plate 25 has the upper wall reinforcement main body section 25a disposed to face a lower side of the upper wall main body section 15a and the upper wall reinforcement bent section 25b extending to be bent downward from the edge of the upper wall reinforcement main body section 25a, and the upper wall reinforcement bent section 25b is coupled to the upper wall bent section 15b. For this reason, the upper wall reinforcement plate 25 and the upper wall plate 15 can have a stronger support structure.

In addition, in the damper housing 10 of the embodiment, the cutout sections 40 are formed in the front upper connecting plate 23F and the rear upper connecting plate 23R having the coupling flanges 35, respectively, and the support brackets 30F and 30R are joined to the upper wall bent section 15b and the upper wall reinforcement bent section 25b in the cutout section 40 and are joined to the coupling flange 35 and the upper wall bent section 15b in the area in which the cutout section 40 is not present while being. For this reason, the support brackets 30F and 30R that are suspension support members can be strongly joined to the upper wall reinforcement bent section 25b of the upper wall reinforcement plate 25, the upper wall bent section 15b of the upper wall plate 15, and the front upper connecting plate 23F or the coupling flange 35 of the rear upper connecting plate 23R. In addition, since the plate members are laid as a third layer and joined to each other, they can be easily joined through resistance welding such as spot welding or the like.

Further, in the case of the damper housing 10 of the embodiment, cross sections of the front upper connecting plate 23F and the rear upper connecting plate 23R in the vehicle forward/rearward direction are formed in a crank shape, and the crank-shaped cross-sectional shape extends in the vehicle width direction. For this reason, the load input from the damper 11 or the suspension arm 13 to the upper wall plate 15, the front wall plate 16, the rear wall plate 17, or the like, can be efficiently supported by the upper member 9 with high rigidity of the front upper connecting plate 23F and the rear upper connecting plate 23R. Accordingly, when the configuration is employed, the outer edge connecting plate 24 can be reduced in weight by reducing a thickness of the outer edge connecting plate 24 (the lateral member) connected to an outer side of the upper wall plate 15 in the vehicle width direction, adding a weight-reducing hole, or the like.

In addition, in the damper housing 10 of the embodiment, the end portion 48 of the overlapping part between the front wall bent section 16b of the front wall plate 16 and the rear wall bent section 17b of the rear wall plate 17 is disposed at substantially the same position as the bending starting section 45 of the front side frame 4 in the vehicle forward/rearward direction. For this reason, during the input of the shock load from the vehicle forward/rearward direction, a collapse region can be widened and the input shock can be flexibly absorbed by deforming the damper housing 10 together with the front side frame 4. Accordingly, when the configuration is employed, both of guarantee of high support rigidity of the damper housing 10 during normal use and a flexible shock absorption property during the shock input from the vehicle forward/rearward direction can be provided.

Figure 7:
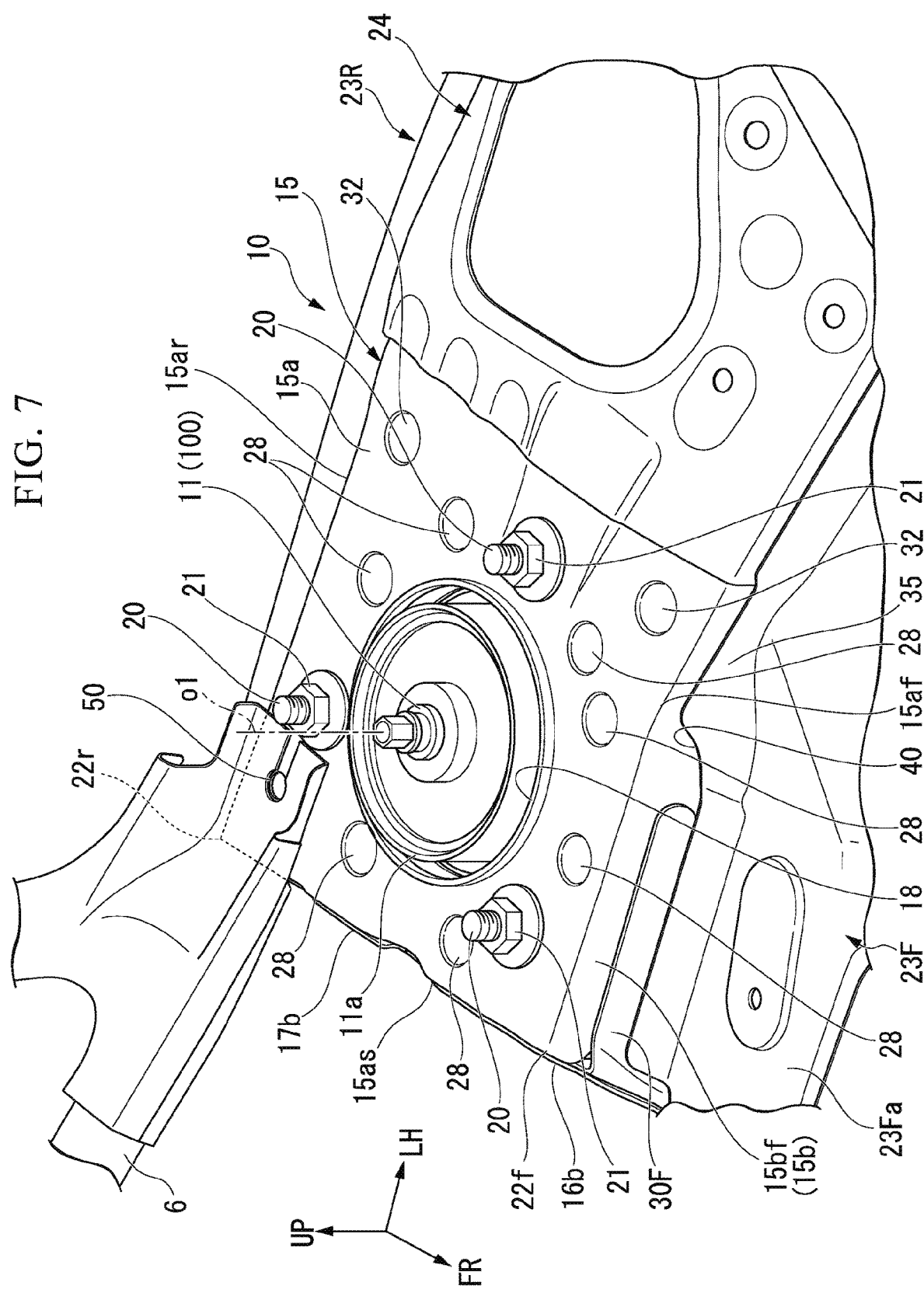
FIG. 7 is a perspective view of a damper housing of another embodiment.

FIG. 7 shows a damper housing 110 of another embodiment from above of a left front section as the same view as FIG. 3.

The damper housing 110 of the embodiment has a basic configuration that is substantially the same as that of the above-mentioned embodiment. However, a connecting point 50 connected to the end portion of the tower bar 6 on the upper wall plate 15 is different from that of the embodiment. That is, while the end portion of the tower bar 6 is fixed together to the bolt 20 configured to couple the upper end portion of the damper 11 to the upper wall plate 15 in the above-mentioned embodiment, the connecting point 50 is disposed in the vicinity of the three-face joining section 22r of the upper wall plate 15 on the rear side of the vehicle separated from the protrusion of the bolt 20 in the embodiment.

In the case of the embodiment, since the end portion of the tower bar 6 is connected to the vicinity of the three-face joining section 22r with high rigidity, twist of the left and right damper support sections can be efficiently minimized. In addition, in this configuration, since the connecting point 50 of the tower bar 6 is disposed in the area separated from the protruding position of the bolt 20 for fixing the damper, disposition of the tower bar 6 is not restricted by the bolt 20 for fixing the damper.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A damper housing for a vehicle configured to support a load input from a damper of a suspension, the damper housing for a vehicle comprising:
   an upper wall plate configured to cover the damper from at least above; and
   an upper wall reinforcement plate coupled to the upper wall plate at below the upper wall plate,
   wherein a plurality of collars through which fastening members for attaching the damper are inserted are interposed between the upper wall plate and the upper wall reinforcement plate, the plurality of collars being disposed on a circumference about a central axis of the damper,
   an upper section of the damper is fastened and fixed to the upper wall reinforcement plate and the upper wall plate by the fastening members inserted through the collars,
   a first concave section is provided in at least one of the upper wall plate and the upper wall reinforcement plate which are facing each other, the first concave section being formed on the upper wall plate or the upper wall reinforcement plate so as to protrude toward the facing upper wall plate or the upper wall reinforcement plate and being disposed between the neighboring collars among the circumference on which the collars are disposed, and
   the upper wall plate or the upper wall reinforcement plate are coupled to the facing upper wall plate or the upper wall reinforcement plate at the first concave section.

2. The damper housing for a vehicle according to claim 1, further comprising a lateral member configured to connect the upper wall plate and the upper wall reinforcement plate to an upper member of a side portion of the vehicle at an outer side position of the upper wall plate in a vehicle width direction,
   wherein the upper wall plate and the upper wall reinforcement plate are formed in a substantially rectangular shape when seen in a plan view,
   a second concave section is provided in at least one of the upper wall plate and the upper wall reinforcement plate which are facing each other, the second concave section being formed on the upper wall plate or the upper wall reinforcement plate so as to protrude toward the facing upper wall plate or the upper wall reinforcement plate and being disposed in a vicinity of a corner section of the upper wall plate or the upper wall reinforcement plate which is located at outer side in the vehicle width direction, and
   the lateral member is coupled to at least one of the upper wall plate and the upper wall reinforcement plate at a position adjacent to the second concave section.

3. The damper housing for a vehicle according to claim 1, further comprising:
   a front wall plate configured to cover at least a front of the damper; and
   a rear wall plate configured to cover at least a rear of the damper,
   wherein the upper wall plate has a substantially flat upper wall main body section configured to support an upper end portion of the damper and an upper wall bent section extending to be bent downward from an end portion of the upper wall main body section,
   the front wall plate has a front wall main body section configured to cover the front of the damper and a front wall bent section extending to be bent rearward from an inner end portion of the front wall main body section in the vehicle width direction,
   the rear wall plate has a rear wall main body section configured to cover the rear of the damper and a rear wall bent section extending to be bent forward from an inner end portion of the rear wall main body section in the vehicle width direction, and
   the front wall plate and the rear wall plate are coupled to each other at the front wall bent section and the rear wall bent section, the upper wall plate being coupled to the front wall plate and the rear wall plate at the upper wall bent section.

4. The damper housing for a vehicle according to claim 3, wherein the upper wall main body section has a lateral side extending substantially in a vehicle forward/rearward direction at inner side in the vehicle width direction, a front side extending substantially in the vehicle width direction at forward side in the vehicle forward/rearward direction, and a rear side extending substantially in the vehicle width direction at rearward side in the vehicle forward/rearward direction,
   the upper wall bent section has a side bent piece extending to be bent downward from the lateral side, a front bent piece extending to be bent downward from the front side, and a rear bent piece extending to be bent downward from the rear side, and adjacent pieces of the side bent piece, the front bent piece and the rear bent piece are formed as an integrated structure, and
   suspension support members are attached to sections in the vicinity of a three-face joining section in which the upper wall main body section, the side bent piece and the front bent piece are substantially perpendicular to each other and a three-face joining section in which the upper wall main body section, the side bent piece and the rear bent piece are substantially perpendicular to each other.

5. The damper housing for a vehicle according to claim 4, comprising a connecting point of a tower bar configured to minimize twisting of left and right damper support sections of the vehicle,
   wherein the connecting point is disposed in a vicinity of the three-face joining section of the upper wall main body section.

6. The damper housing for a vehicle according to claim 3, wherein the upper wall reinforcement plate has an upper wall reinforcement main body section disposed so as to face a lower side of the upper wall main body section, and an upper wall reinforcement bent section extending to be bent downward from an edge of the upper wall reinforcement main body section, and
   the upper wall reinforcement bent section is coupled to the upper wall bent section.

7. The damper housing for a vehicle according to claim 6, further comprising an upper connecting plate that is disposed at least at one of between the upper wall main body section and an upper position of the front wall main body section and between the upper wall main body section and an upper position of the rear wall main body section and that is configured to connect the upper wall plate to the upper member of the side portion of the vehicle,
   wherein the upper connecting plate has a coupling flange joined to the upper wall bent section at a position in front of or rear of the upper wall plate,
   a suspension support member extending outward from the front wall bent section or the rear wall bent section in the vehicle width direction is interposed between the upper wall bent section and the coupling flange,
   the coupling flange has a cutout section, and
   the suspension support member is joined to at least one member of the upper wall bent section and the upper wall reinforcement bent section in the cutout section of the coupling flange, and joined to at least the coupling flange among the coupling flange and the upper wall bent section in an area in which the cutout section is not present.

8. The damper housing for a vehicle according to claim 7, wherein the upper connecting plate has a crank-shaped cross-sectional shape extending substantially in the vehicle width direction.

9. The damper housing for a vehicle according to claim 3, wherein the rear wall plate and the front wall plate are disposed on an upper part of a front side frame of the vehicle,
   the front side frame has a bending starting section that becomes a starting point of deformation when a shock load is input from the vehicle forward/rearward direction,
   the front wall bent section and the rear wall bent section are joined to each other in an overlapping manner, and
   an end portion in the vehicle forward/rearward direction of the overlapping part between the front wall bent section and the rear wall bent section is disposed at substantially same position as the bending starting section in the vehicle forward/rearward direction.

* * * * *